United States Patent

Rosellini

(10) Patent No.: US 8,733,174 B2
(45) Date of Patent: May 27, 2014

(54) VIBRATING SENSOR HAVING TWO CHANNELS ACTIVATED IN SEQUENCE

(75) Inventor: Lionel Rosellini, Paris (FR)

(73) Assignee: SAGEM Defense Securite, Paris (FR)

( * ) Notice: Subject to any disclaimer, the term of this patent is extended or adjusted under 35 U.S.C. 154(b) by 166 days.

(21) Appl. No.: 12/775,814

(22) Filed: May 7, 2010

(65) Prior Publication Data

US 2010/0281988 A1 Nov. 11, 2010

Related U.S. Application Data

(60) Provisional application No. 61/233,036, filed on Aug. 11, 2009.

(30) Foreign Application Priority Data

May 7, 2009 (FR) ..................................... 09 02213

(51) Int. Cl.
*G01H 1/00* (2006.01)

(52) U.S. Cl.
USPC .......................................................... 73/658

(58) Field of Classification Search
USPC .......................................................... 73/658
See application file for complete search history.

(56) References Cited

U.S. PATENT DOCUMENTS 5,581,186 A * 12/1996 Keller ............................ 324/318
2005/0126289 A1 * 6/2005 Ragot et al. ....................... 73/510

FOREIGN PATENT DOCUMENTS

EP 1 541 967 A 6/2005

* cited by examiner

*Primary Examiner* — Hezron E Williams
*Assistant Examiner* — Gregory J Redmann
(74) *Attorney, Agent, or Firm* — Muncy, Geissler, Olds & Lowe, P.C.

(57) ABSTRACT

A vibrating sensor having a base and an axisymmetrical resonator secured to the base. The base and the resonator are associated with electrodes connected to a control circuit via at least a first connection channel and a second connection channel with the electrodes being connected to one or other of the channels. The control circuit has excitation electronics and detection electronics and is arranged to control an excitation stage and a detection stage on each of the connection channels. The excitation stages and the detection stages have substantially identical respective durations, wherein the control circuit is arranged to perform the following sequence: excitation stage on the second connection channel; detection stage on the first connection channel; excitation stage on the first connection channel; detection stage on the second connection channel.

1 Claim, 1 Drawing Sheet

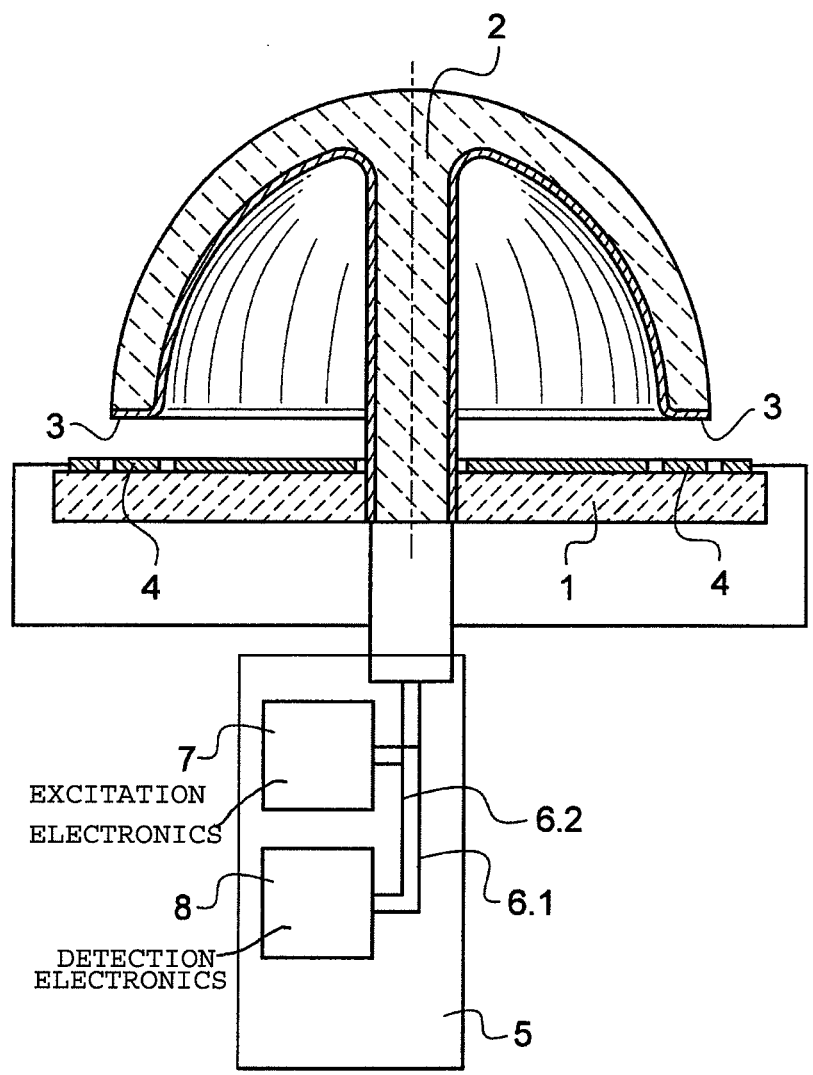

VIBRATING SENSOR HAVING TWO CHANNELS ACTIVATED IN SEQUENCE

CROSS REFERENCE TO RELATED APPLICATIONS

This application claims priority of Application No. 09 02213 filed in France on May 7, 2009 under 35 U.S.C. §119; and this application claims priority of U.S. Provisional Application No. 61/233,036 filed on Aug. 11, 2009 under 35 U.S.C. §119(e), the entire contents of all of which are hereby incorporated by reference.

BACKGROUND OF THE INVENTION

1. Field of the Invention

The present invention relates to a vibrating sensor, e.g. suitable for use in constituting a gyro.

2. Brief Discussion of the Prior Art

Vibrating gyros are known that comprise a base and a resonator secured to the base. The base and the resonator are associated with electrodes that are organized in two groups that are connected in alternation to a detection and control circuit via a first connection channel and then a second connection channel, with each of the groups of electrodes being connected to a respective one of the channels.

The control circuit comprises excitation electronics and detection electronics and is arranged to control an excitation stage and a detection stage on each of the connection channels, the excitation stages and the detection stages having substantially identical respective durations (e.g. 60 microseconds (µs) for the excitation stages and 140 µs for the detection stages). The durations of the detection and excitation stages may vary as a function of the sensor in question. The control circuit is generally arranged to perform the following sequence: excitation stage on the first connection channel; excitation stage on the second connection channel; detection stage on the first connection channel; detection stage on the second connection channel.

That sequencing makes it possible to use the same excitation electronics for exciting both groups of electrodes, and the same detection electronics for detecting signals provided by both groups of electrodes. This serves to limit the influence of differences in gain and phase on the two channels, which differences might give rise to a setting angle error and to drift of the gyro. Nevertheless, that sequencing causes couplings to appear between the various stages. Those couplings are associated, for example, with memory effects in the digital-to-analog converters that result from stray capacitances of the printed circuit card on which the circuits are formed, which capacitances, in series with high value resistances present in the electronics, give rise to disturbances over a length of time that may be greater than the duration of a stage. Couplings may occur between two successive detection stages, two successive excitation stages, a detection stage and an excitation stage following said detection stage, or an excitation stage and a detection stage following said excitation stage. Coupling gives rise to bias in the following stage, which bias is proportional to the control signal processed during the preceding stage. These last two couplings, due in particular to charge accumulating on the electrodes, provide the majority contribution to the mean drift of the gyro, and it is difficult to limit this drift by electronic compensation.

The instability of those defects has a strong influence on the performance of the sensor, particularly in a humid environment.

Proposals have been made to reduce the control or precession dynamic range in order to remedy the above-mentioned drawbacks. Proposals have been made to introduce additional relaxation times in order to limit those defects.

SUMMARY OF THE INVENTION

The invention is based on a different approach and seeks to limit the effect of the above-mentioned defects without modifying the control circuit.

To this end, the invention provides a vibrating sensor comprising a base and an axisymmetrical resonator secured to the base, the base and the resonator being associated with electrodes connected to a control circuit via at least a first connection channel and a second connection channel, with the electrodes being connected to one or other of the channels, the control circuit comprising excitation electronics and detection electronics and being arranged to control an excitation stage and a detection stage on each of the connection channels, the excitation stages and the detection stages having substantially identical respective durations, wherein the control circuit is arranged to perform the following sequence: excitation stage on the second connection channel; detection stage on the first connection channel; excitation stage on the first connection channel; detection stage on the second connection channel.

This sequence serves to maximize the separation between the detection and excitation stages using the same channel, thereby serving to reduce strong excitation-detection or detection-excitation coupling within a given channel. In addition, weak excitation-detection or detection-excitation coupling between the two channels are rendered symmetrical. Furthermore, each excitation stage is immediately preceded by a detection stage on the same channel: interference generated by the preceding detection stage thus acts in the same direction as the following excitation command. Other characteristics and advantages of the invention appear on reading the following description of a particular, non-limiting embodiment of the invention.

BRIEF DESCRIPTION OF THE DRAWING

Reference is made to the sole accompanying FIGURE that is a diagram of a vibrating sensor in accordance with the invention.

DETAILED DESCRIPTION OF THE PREFERRED EMBODIMENTS

The vibrating sensor in accordance with the invention is, for example, a gyro suitable for use in a target locator system that is portable and of very great accuracy, in a system of the gyro compass type.

With reference to the FIGURE, the vibrating sensor comprises a base 1 and an axisymmetrical resonator 2, here made in the form of a bell having a central stem secured to the base 1.

Electrodes 3 are associated in known manner with the peripheral edge of the bell 2. Electrodes 4 are associated in known manner with the base 1 facing the electrodes 3.

The electrodes 3, 4 are connected to a control circuit 5 via at least a first connection channel 6.1 and a second connection channel 6.2, with each of the electrodes 3, 4 being connected to one or other of the two channels, thus forming two groups of electrodes depending on the connection channel to which the electrodes are connected.

The control circuit 5 comprises excitation electronics 7 and detection electronics 8. The control circuit 5 is arranged to execute a program implementing an excitation stage and a detection stage. In the excitation stage, the control circuit 5 acts via the excitation electronics 6 to send a command signal to the electrodes so as to set the bell into vibration at a given angle, so as to maintain the amplitude of the vibration constant, and so as to maintain zero amplitude in quadrature therewith. In the detection stage, the control circuit 5 acts via the detection electronics 8 to recover a signal representative of a vibration angle. The excitation and detection stages are respectively of substantially identical durations, specifically 60 µs for the excitation stages and 140 µm for the detection stages.

The control unit 5 is arranged to perform the excitation stage and the detection stage on each of the connection channels 6.1, 6.2, and more precisely to operate the stages so as to perform the following sequence: excitation stage on the second connection channel 6.2, detection stage on the first connection channel 6.1, excitation stage on the first connection channel 6.1, detection stage on the second connection channel 6.2.

This sequence serves to space the detection stages as far apart as possible from the excitation stages using the same channel, thereby enabling the strongest excitation-detection or detection-excitation coupling within a given channel go be reduced. Furthermore, the excitation-detection or detection-excitation couplings between the two channels are symmetrical, thereby limiting their influence on the drift of the sensor. In addition, each excitation stage is immediately preceded by a detection stage on the same channel: interference generated by the preceding detection stage thus acts in the same direction as the following excitation command, consequently limiting the effect on sensor errors.

Naturally, the invention is not limited to the embodiment described but covers any variant coming within the ambit of the invention as defined by the claim.

The invention is applicable to any type of axisymmetrical resonator associated with digital control electronics operating in shared time on two connection channels. The invention is more particularly adapted to sensors presenting a large control dynamic range or high levels of damping and large stiffness anisotropies.

What is claimed is:

1. A method for controlling a vibrating sensor comprising a base and an axisymmetrical resonator secured to the base, the base and the axisymmetrical resonator being associated with electrodes connected to a control circuit via at least a first connection channel and a second connection channel with the electrodes being connected to one or other of the channels, the control circuit comprising excitation electronics and detection electronics and being arranged to control an excitation stage and a detection stage on each of the connection channels, the method comprising the step of controlling excitation stages and the detection stages so that the excitation stages and the detection stages have substantially identical respective durations, and in such a manner the following sequence is performed: excitation stage on the second connection channel; detection stage on the first connection channel; excitation stage on the first connection channel; and detection stage on the second connection channel.

* * * * *